United States Patent Office 3,422,922
Patented Jan. 21, 1969

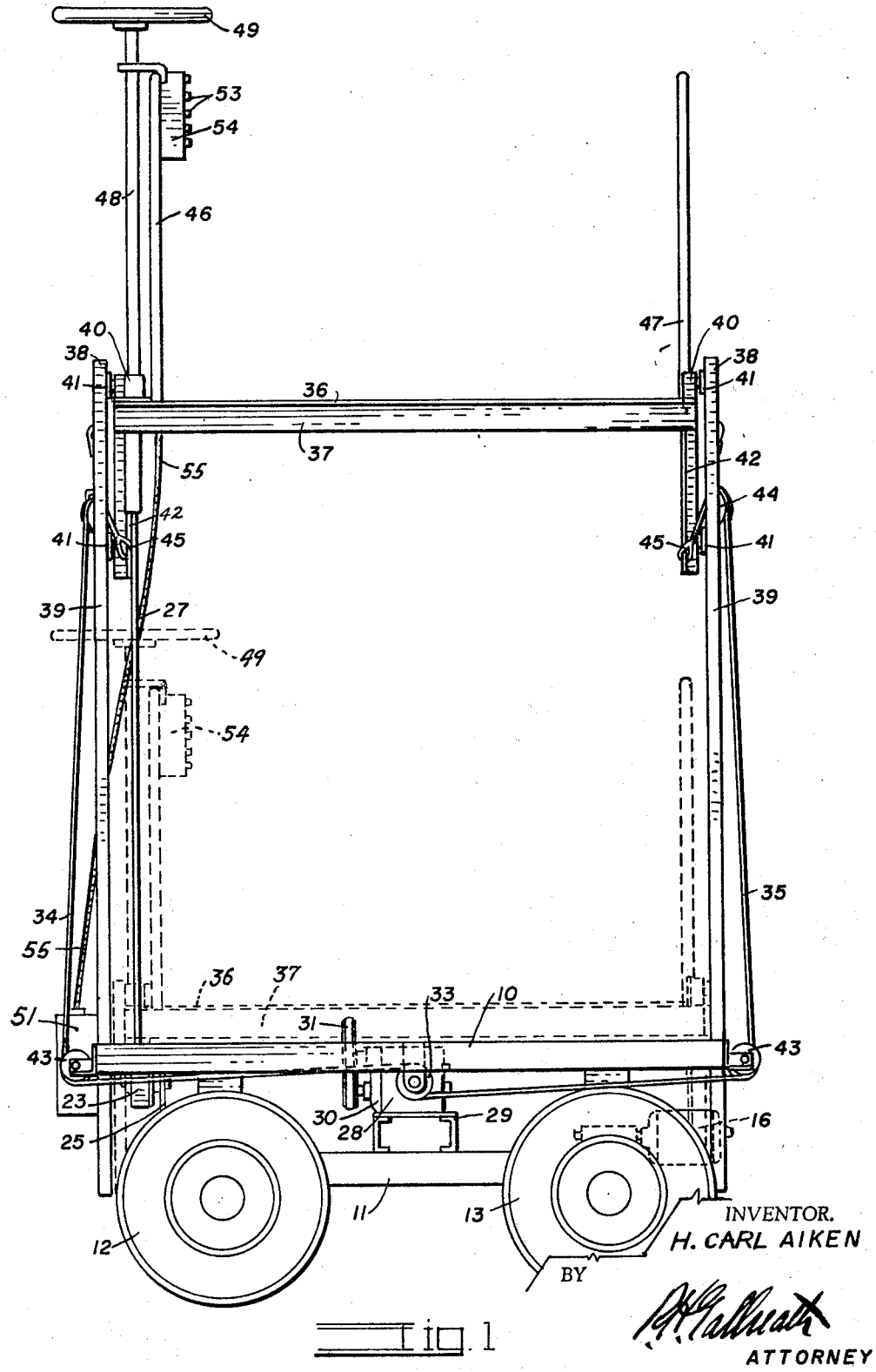

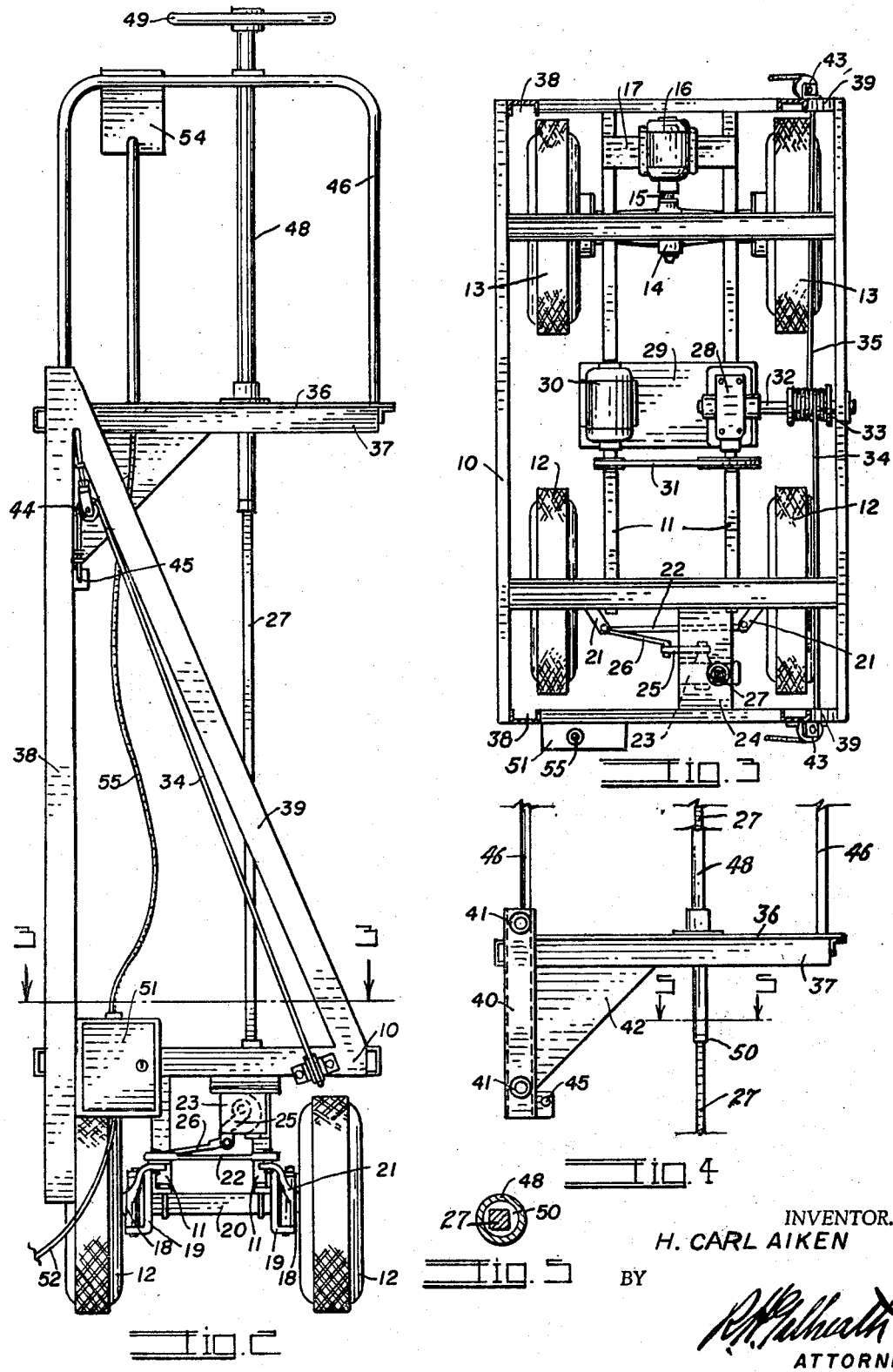

3,422,922
MOTORIZED SCAFFOLDS
Homer Carl Aiken, 1545 Glenarm Place,
Denver, Colo. 80202
Filed July 10, 1967, Ser. No. 652,297
U.S. Cl. 182—14         7 Claims
Int. Cl. E04g 1/22

ABSTRACT OF THE DISCLOSURE

A motor propelled, steerable, wheeled truck carrying a vertical guide frame in which a platform is mounted for vertical movement through the medium of tension cables wound upon a reversible motor-driven winch on said truck, all vertical movements of said platform and all horizontal movements of said truck being controllable by an operator on said platform.

---

This invention is designed more particularly for use by structural mechanics engaged in the erection of, and the maintenance of, buildings and similar structures and has for its principal object the provision of a portable automotive vehicle which will replace the temporary scaffolds usually employed in the construction and maintenance of buildings and which will be both horizontally and vertically self-controlled and self-propelled so that the mechanic can position himself and his equipment both horizontally and vertically at the places where the work is to be done without leaving his working position.

Other objects and advantages reside in the detail construction of the invention, which is designed for simplicity, economy, and efficiency. These will become more apparent from the following description.

In the following detailed description of the invention, reference is made to the accompanying drawings which form a part hereof. Like numerals refer to like parts in all views of the drawings and throughout the description.

In the drawings:

FIG. 1 is a front elevational view of the motorized scaffold of this invention showing an elevated position in solid lines and a lowered position in broken lines;

FIG. 2 is a side elevational view thereof, looking in the direction of the arrow 2 in FIG. 1;

FIG. 3 is a horizontal cross section looking downwardly on the line 3—3, FIG. 2;

FIG. 4 is a fragmentary detail end view of one extremity of the platform employed in this invention; and FIG. 5 is an enlarged detail section taken on the line 5—5, FIG. 4.

The motorized scaffold employs a wheeled truck consisting of an open, rectangular, elongated, chassis frame 10, preferably formed of structural channel-iron and supported from parallel, longitudinally-extending, stringers 11 which are in turn supported from a pair of steerable wheels 12 and a pair of drive wheels 13.

The drive wheels 13 are mounted on the extremities of axles protruding oppositely from a different housing 14 which is similar to the differential housings as used on present day automobiles which have a propeller shaft 15 protruding therefrom for driving the drive wheels 13. In this case however, the propeller shaft 15 is connected to and driven by a reversible electric drive motor 16 mounted upon a suitable motor support 17 extending between the stringers 11 at one extremity of chassis frame 10.

The steerable wheels 12 are mounted upon the stub axles of conventional automotive steering knuckles 18 pivotally mounted in steering yokes 19 on the extremities of an axle 20 secured beneath the stringers 11 at the other extremity of the chassis frame. The conventional steering arms 21 of the steering knuckles 18 are interconnected by a radius rod 22 so as to cause the two wheels 12 to pivot simultaneously as is customary in automotive steering mechanisms. A standard speed-reducer 23, of the worm gear type from which a slow speed shaft and high speed shaft protrudes, is suspended below a supporting plate 24 at one extremity of the chassis frame and a drop arm 25 is mounted on and extends downwardly from the slow speed shaft thereof. The drop arm 25 is connected by means of a drag link 26 to the radius rod 22 to steer the wheels 12 and a steering shaft 27 extends vertically upward from the high speed shaft of the speed reducer 23 to impart movement to the drop arm 25 somewhat similarly to a conventional automotive steering mechanism.

A second similar, conventional speed reducer 28 is mounted on a supporting plate 29 between the stringers 11 and intermediate the pairs of wheels. The high speed shaft of the second speed reducer 28 is driven from a second, reversible, electric motor 30 through the medium of a suitable V-belt transmission 31. The low speed shaft of the second reducer 28, indicated at 32, extends toward the front side of the chassis frame and carries a cable reel 33 fixedly mounted thereon to which a left lifting cable 34 and a right lifting cable 35 are attached so that rotation of the reel in one direction will simultaneously wind both cables on the reel and rotation in the opposite direction will simultaneously unwind both cables. The cables 34 and 35 are for the purpose of raising and lowering a worker's platform consisting of a metal floor plate 36 mounted upon a rectangular platform frame 37. The platform frame 37 is positioned between two vertical, channel-track elements 38 mounted at the two rear corners of the chassis frame 10 and extend upwardly and downwardly therefrom in vertical parallel relation with their channel sides facing toward each other to form platform guide tracks. The two track elements are rigidly braced against forward and back movements on the chassis frame 10 by means of inclined channel braces 39 extending to the two front corners of the chassis frame 10.

A vertical roller-supporting channel-iron 40 carrying two vertically aligned, spaced-apart rollers 41 is welded to each rear corner of the platform frame as shown in FIG. 4. The channel-irons 40 extend upwardly and downwardly from the platform frame and are rigidly maintained in 90° relation to the platform frame by means of triangular gusset plates 42 welded thereto. The vertically aligned pairs of rollers at each extremity of the platform fit into, and travel vertically in, the channel of the adjacent guide track element 38 so as to maintain the platform in a horizontal plane at all elevations.

The platform frame 37 is supported by the previously described left and right lifting cables 34 and 35 which are attached to and extend horizontally and oppositely outward from the reel 33 thence upwardly about cable sheaves 43, there-being one of the sheaves 43 at each extremity of the chassis frame 10, thence upwardly over cable sheaves 44, which are freely suspended adjacent the upper extremities of the channel track elements 38, thence downwardly to attachment lugs 45 welded to or formed on the lower extremities of the roller channel irons 40 of the platform frame. Thus, as the motor 30 is energized in one direction, both cables will be reeled on the reel 33 so as to draw the platform upwardly with the rollers 41 travelling upwardly in the guide tracks of the channel track elements 38 and when the motor 30 is reversed the opposite action will take place and the platform will descend.

The platform is provided with a left side rail 46 and a right side rail 47. A vertical, tubular steering column 48 is rotatably mounted on the left rail 46 and is provided with a steering wheel 49. The tubular steering column 48 is aligned with and telescopically engages the steering shaft 27 so that it may move upwardly and downwardly on the latter. However, relative rotation between the tubular column 48 and the shaft 27 is prevented in any suitable manner such as by forming the shaft 27 of square stock and welding or otherwise mounting a bushing 50, having a square shaft opening, in the lower extremity of the tubular steering column 48 to slidably engage the square shaft 27 as shown in the detail section of FIG. 5.

The chassis frame 10 is provided with a circuit switch box 51, containing conventional solenoid operated motor switches, to which a flexible electric cord 52 leads, for supplying the necessary operating current, and from which conventional motor conductors (not shown) lead to the motors 16 and 30. The switches in the switch box 51 are electrically actuated by suitable control buttons 53 on a control box 54 mounted on the left rail 46 and connected to the switch box by the usual flexible multiple-conductor cord 55.

It can be seen from the above that an operator on the platform can control the motor 16 to drive and steer the entire apparatus to the work and can then control the motor 30 to elevate the platform to a convenient working position. Thus, the platform can be continually activated both horizontally and vertically to follow the progress of the work being done.

It will be noted that the vertical track elements 38 are positioned in alignment with the first side of the chassis frame 10 and the platform frame extends as a cantilever over and to the second side of the chassis frame. Thus the first side can be placed against an unobstructed, flat wall so as to substantially rest thereagainst, and since the second side is substantially unobstructed, it can be placed to support the platform above and over projecting structural elements.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A motorized scaffold comprising:
    (a) an elongated, rectangular, open, chassis frame horizontally supported upon a pair of steerable wheels and upon a pair of motor-driven wheels and provided with a vertical, channelled track element adjacent each of its extremities, the channels of said elements facing inwardly toward each other;
    (b) a similarly elongated, rectangular platform positioned between said track elements and provided at each of its extremities with pairs of vertically-aligned rollers travelling in the vertical channels of said track elements;
    (c) a motor-driven cable reel mounted on said chassis frame intermediate the extremities thereof;
    (d) a pair of lifting cables attached to said reel at their one extremity, the individual cables of said pair extending substantially vertically and oppositely outward from said reel toward the extremities of said chassis frame thence upwardly toward the top of the track element at that extremity thence downwardly to a connection with an extremity of said platform, so that when said reel is rotated both cables will be wound thereabout to simultaneously lift both extremities of said platform; and
    (e) means for steering said steerable wheels.

2. A motorized scaffold as described in claim 1 having:
    (a) a cable sheave mounted in each extremity of said chassis frame; and
    (b) a cable sheave mounted adjacent the top of each track element over which said cables are trained.

3. A motorized scaffold as described in claim 2 having a motor control element mounted on said platform for controlling the operation of said motor-driven cable reel and said motor-driven wheels.

4. A motorized scaffold as described in claim 3 in which the means for steering comprises:
    (a) a steering wheel mounted on said platform;
    (b) an automotive steering mechanism mounted on said chassis frame to control the path of said steerable wheels; and
    (c) a telescoping steering column connecting said steering wheel with said steering mechanism, said column transmitting rotative motion and allowing longitudinal extension to accommodate the vertical movements of said platform.

5. A motorized scaffold as described in claim 4 having a vertical roller-supporting element rigidly secured to each extremity of said platform upon each of which one of said pairs of rollers is mounted.

6. A motorized scaffold as described in claim 5 in which said vertical track elements are mounted at the rear corners of said chassis frame and said roller-supporting elements are mounted at the rear corners of said platform so that the entire platform will be forwardly supported as a cantilever over said chassis frame.

7. A motorized scaffold as described in claim 6 having an inclined brace element extending forwardly and downwardly from adjacent the top of each vertical track element to a front corner of said chassis frame to resist the forward bending bias imparted by the cantilever action of said platform.

References Cited
UNITED STATES PATENTS

| | | | |
|---|---|---|---|
| 2,420,903 | 5/1947 | Noble | 182—145 |
| 3,156,317 | 11/1964 | Lundeen | 182—16 |
| 3,180,450 | 4/1965 | Crager | 182—16 |

REINALDO P. MACHADO, *Primary Examiner.*

U.S. Cl. X.R.

182—148, 16